US010822122B2

(12) United States Patent
Grose et al.

(10) Patent No.: US 10,822,122 B2
(45) Date of Patent: Nov. 3, 2020

(54) VERTICAL LANDING SYSTEMS FOR SPACE VEHICLES AND ASSOCIATED METHODS

(71) Applicant: Blue Origin, LLC, Kent, WA (US)

(72) Inventors: Douglas Lewis Grose, Auburn, WA (US); Sean Robert Findlay, Mercer Island, WA (US); John Michael Sanders, Sammamish, WA (US)

(73) Assignee: Blue Origin, LLC, Kent, WA (US)

( * ) Notice: Subject to any disclaimer, the term of this patent is extended or adjusted under 35 U.S.C. 154(b) by 685 days.

(21) Appl. No.: 15/855,968

(22) Filed: Dec. 27, 2017

(65) Prior Publication Data

US 2018/0178930 A1 Jun. 28, 2018

Related U.S. Application Data

(60) Provisional application No. 62/439,658, filed on Dec. 28, 2016.

(51) Int. Cl.
*B64G 1/62* (2006.01)
*B64G 1/40* (2006.01)

(52) U.S. Cl.
CPC .............. *B64G 1/62* (2013.01); *B64G 1/401* (2013.01)

(58) Field of Classification Search
CPC .......... B64G 1/62; B64G 1/401; B64G 1/002; B64G 5/00
See application file for complete search history.

(56) References Cited

U.S. PATENT DOCUMENTS

| 2,342,773 A | 2/1944 | Wellman |
| 2,464,827 A | 3/1949 | Noyes |
| 2,668,026 A | 2/1954 | Price |
| 2,807,429 A | 9/1957 | Hawkins et al. |
| 2,824,711 A | 2/1958 | Porter et al. |
| 2,835,199 A | 5/1958 | Stanly |
| 2,837,300 A | 6/1958 | Sullivan |
| 2,846,164 A | 8/1958 | Haberkorn |
| 2,862,680 A | 12/1958 | Berger |
| 2,870,599 A | 1/1959 | Long et al. |
| 2,923,495 A | 2/1960 | Von Zborowski |
| 2,959,376 A | 11/1960 | Saurma |
| 2,971,724 A | 2/1961 | Von Zborowski |

(Continued)

FOREIGN PATENT DOCUMENTS

| CN | 101301931 A | 11/2008 |
| DE | 10061772 C1 | 5/2002 |

(Continued)

OTHER PUBLICATIONS

Boelitz et al., "Kistler Launch Assist Platform Return to Burn Control," American Institute of Aeronautics and Astronautics, Proceedings of AIAA Guidance, Navigation, and Control Conference and Exhibit, Aug. 9-11, 1999, 11pages.

(Continued)

*Primary Examiner* — Valentina Xavier
(74) *Attorney, Agent, or Firm* — Perkins Coie LLP

(57) ABSTRACT

Methods and systems for vertically landing space vehicles are described herein. In one embodiment, a reusable space vehicle lands in a vertical, nose-up orientation by engaging a system of cables suspended from an elevated framework during a controlled descent.

18 Claims, 6 Drawing Sheets

(56) References Cited

U.S. PATENT DOCUMENTS

| | | |
|---|---|---|
| 2,977,080 A | 3/1961 | Von Zborowski |
| 3,000,593 A | 9/1961 | Eggers et al. |
| 3,065,937 A | 11/1962 | Vigil |
| 3,093,346 A | 6/1963 | Faget et al. |
| 3,098,445 A | 7/1963 | Jackson et al. |
| 3,118,636 A | 1/1964 | Kantrowitz et al. |
| 3,125,313 A | 3/1964 | Soderberg |
| 3,176,464 A | 4/1965 | Meyer et al. |
| 3,188,957 A | 6/1965 | Petre |
| 3,191,566 A | 6/1965 | Wilken et al. |
| 3,198,459 A | 8/1965 | Geary |
| 3,210,025 A | 10/1965 | Lubben |
| 3,215,372 A | 11/1965 | Price |
| 3,231,219 A | 1/1966 | Young |
| 3,252,673 A | 5/1966 | Reichert |
| 3,279,188 A | 10/1966 | Price |
| 3,285,175 A | 11/1966 | Keenan |
| 3,286,951 A | 11/1966 | Kendall |
| 3,295,790 A | 1/1967 | Bono et al. |
| 3,302,908 A | 2/1967 | Michel |
| 3,350,887 A | 11/1967 | Leunig et al. |
| 3,403,873 A | 10/1968 | Bell et al. |
| 3,508,724 A | 4/1970 | Scher et al. |
| 3,534,686 A | 10/1970 | Watson |
| 3,603,533 A | 9/1971 | Stripling |
| 3,606,212 A | 9/1971 | Bradley |
| 3,711,040 A | 1/1973 | Carver |
| 3,768,255 A | 10/1973 | Barnes, Jr. et al. |
| 3,806,064 A | 4/1974 | Parilla |
| 3,903,801 A | 9/1975 | Senoski |
| 3,966,142 A | 6/1976 | Corbett et al. |
| 4,500,052 A | 2/1985 | Kim |
| 4,700,912 A | 10/1987 | Corbett |
| 4,795,113 A | 1/1989 | Minovitch |
| 4,796,839 A | 1/1989 | Davis |
| 4,804,155 A | 2/1989 | Strumbos |
| 4,832,288 A | 5/1989 | Kendall et al. |
| 4,834,324 A | 5/1989 | Criswell |
| 4,896,847 A | 1/1990 | Gertsch |
| 4,964,340 A | 10/1990 | Daniels et al. |
| 5,080,306 A | 1/1992 | Porter et al. |
| 5,086,993 A | 2/1992 | Wainfan |
| 5,094,409 A | 3/1992 | King et al. |
| 5,295,643 A | 3/1994 | Ebbert et al. |
| 5,318,255 A | 6/1994 | Facciano et al. |
| 5,318,256 A | 6/1994 | Appleberry |
| 5,398,635 A | 3/1995 | Tellington |
| 5,417,393 A | 5/1995 | Klestadt |
| 5,526,999 A | 6/1996 | Meston |
| 5,568,901 A | 10/1996 | Stiennon |
| 5,595,358 A | 1/1997 | Demidov et al. |
| 5,667,167 A * | 9/1997 | Kistler ................ B64G 1/002 244/110 E |
| 5,678,784 A | 10/1997 | Marshall, Jr. et al. |
| 5,743,492 A | 4/1998 | Chan et al. |
| 5,842,665 A | 12/1998 | McKinney et al. |
| 5,871,173 A | 2/1999 | Frank et al. |
| 5,873,549 A | 2/1999 | Lane et al. |
| 5,927,653 A | 7/1999 | Mueller et al. |
| 5,932,830 A | 8/1999 | Kristensen et al. |
| 6,024,006 A | 2/2000 | Kindem et al. |
| 6,076,771 A | 6/2000 | Bailey et al. |
| 6,158,693 A | 12/2000 | Mueller et al. |
| 6,176,451 B1 | 1/2001 | Drymon |
| 6,193,187 B1 | 2/2001 | Scott et al. |
| 6,247,666 B1 | 6/2001 | Baker et al. |
| 6,360,994 B2 | 3/2002 | Hart et al. |
| 6,364,252 B1 | 4/2002 | Anderman |
| 6,398,166 B1 | 6/2002 | Ballard et al. |
| 6,450,452 B1 | 9/2002 | Spencer et al. |
| 6,454,216 B1 | 9/2002 | Kiselev et al. |
| 6,502,787 B1 | 1/2003 | Barrett |
| 6,557,803 B2 | 5/2003 | Carpenter et al. |
| 6,616,092 B1 | 9/2003 | Barnes |
| 6,651,578 B1 | 11/2003 | Gorman |
| 6,666,402 B2 | 12/2003 | Rupert et al. |
| 6,666,409 B2 | 12/2003 | Carpenter et al. |
| 6,698,685 B2 | 3/2004 | Walmsley |
| 6,817,580 B2 | 11/2004 | Smith |
| 6,926,576 B1 | 8/2005 | Alway et al. |
| 6,929,576 B2 | 8/2005 | Armstrong et al. |
| 6,932,302 B2 | 8/2005 | Martin |
| 7,152,547 B1 | 12/2006 | Hovland |
| 7,226,017 B2 | 6/2007 | Blevio, Sr. |
| 7,287,722 B2 | 10/2007 | Diamandis et al. |
| 7,344,111 B2 | 3/2008 | Janeke |
| 8,047,472 B1 | 11/2011 | Brand et al. |
| 8,408,443 B2 | 4/2013 | Miryekta et al. |
| 8,408,497 B2 | 4/2013 | Boelitz et al. |
| 8,424,808 B2 | 4/2013 | Boelitz |
| 8,729,442 B2 | 5/2014 | Boelitz |
| 8,733,706 B1 | 5/2014 | Fernandez et al. |
| 8,878,111 B2 | 11/2014 | Featherstone |
| 8,894,016 B2 | 11/2014 | Featherstone |
| 8,991,767 B2 | 3/2015 | Featherstone |
| 9,487,308 B2 | 11/2016 | Featherstone |
| 9,580,191 B2 | 2/2017 | Featherstone |
| 2002/0096041 A1 | 7/2002 | Briggs et al. |
| 2002/0179776 A1 | 12/2002 | Mueller et al. |
| 2003/0042367 A1 | 3/2003 | Carpenter et al. |
| 2003/0150961 A1 | 8/2003 | Boelitz |
| 2003/0192984 A1 | 10/2003 | Smith et al. |
| 2004/0124312 A1 | 7/2004 | Mueller et al. |
| 2005/0072876 A1 | 4/2005 | Ducasse |
| 2006/0006289 A1 | 1/2006 | Janeke |
| 2006/0038061 A1 | 2/2006 | Blevio |
| 2006/0049316 A1 | 3/2006 | Antonenko et al. |
| 2006/0113425 A1 | 6/2006 | Rader |
| 2007/0012820 A1 | 1/2007 | Buehler |
| 2007/0120019 A1 | 5/2007 | August |
| 2008/0078884 A1 | 4/2008 | Trabandt et al. |
| 2008/0217481 A1 | 9/2008 | Janeke |
| 2009/0108137 A1 | 4/2009 | Simon et al. |
| 2009/0205311 A1 | 8/2009 | Bulman et al. |
| 2009/0206204 A1 | 8/2009 | Rosen |
| 2010/0012776 A1 | 1/2010 | Hursig |
| 2010/0051751 A1 | 3/2010 | Mueller et al. |
| 2010/0170981 A1 | 7/2010 | Belleville |
| 2010/0314487 A1 | 12/2010 | Boelitz |
| 2010/0314497 A1 | 12/2010 | Boelitz |
| 2010/0320329 A1 | 12/2010 | Boelitz et al. |
| 2011/0017872 A1 | 1/2011 | Bezos et al. |
| 2011/0024558 A1 | 2/2011 | Blevio, Sr. |
| 2011/0097995 A1 | 4/2011 | Caplin et al. |
| 2011/0114792 A1 | 5/2011 | Im |
| 2011/0127382 A1 | 6/2011 | Im |
| 2014/0042267 A1 | 2/2014 | Featherstone |
| 2014/0263841 A1 | 9/2014 | Featherstone et al. |
| 2014/0360157 A1 | 12/2014 | Barker |
| 2015/0034770 A1 | 2/2015 | Vandervort |
| 2016/0023782 A1 | 1/2016 | Featherstone |
| 2016/0311556 A1* | 10/2016 | Knudsen ................ B64G 5/00 |
| 2017/0267380 A1 | 9/2017 | Featherstone et al. |
| 2018/0044035 A1* | 2/2018 | McDonnell ............ B64G 1/002 |
| 2020/0049011 A1* | 2/2020 | Neiser ................ F04D 19/007 |

FOREIGN PATENT DOCUMENTS

| | | |
|---|---|---|
| DE | 10058339 A1 | 6/2002 |
| EP | 0622604 | 11/1994 |
| EP | 1340316 A1 | 9/2003 |
| GB | 1522018 A | 8/1978 |
| JP | 07172397 | 7/1995 |
| JP | H0811800 | 1/1996 |
| JP | 10505560 | 6/1998 |
| JP | 2000508601 A | 7/2000 |
| JP | 2001501151 A | 1/2001 |
| JP | 3239698 B2 | 12/2001 |
| JP | 2002535193 A | 10/2002 |
| RU | 1837038 | 8/1993 |
| RU | 2053168 C1 | 1/1996 |
| RU | 2088787 | 1/1996 |
| RU | 2104898 | 2/1998 |
| RU | 2192992 | 11/2002 |

(56) References Cited

FOREIGN PATENT DOCUMENTS

| RU | 2221214 | 10/2004 |
|---|---|---|
| UA | 19433 U | 12/2006 |
| WO | WO-9604168 | 2/1996 |
| WO | WO-9738903 | 10/1997 |
| WO | WO-9813260 | 4/1998 |
| WO | WO-2009032585 A1 | 3/2009 |
| WO | WO-2009094603 | 7/2009 |
| WO | WO-2010099228 A1 | 9/2010 |
| WO | WO-2010141111 A2 | 12/2010 |
| WO | WO-2010141124 A1 | 12/2010 |
| WO | WO-2016137877 | 9/2016 |

OTHER PUBLICATIONS

Hattis et al., "Overview of the Kistler K1 Guidance and Control System," American Institute of Aeronautics and Astronautics, Proceedings of AIAA Guidance, Navigation, and Control Conference and Exhibit, Aug. 9-11, 1999, 17 pages.

Berger et al., "AD-A265 940 Environmental Assessment DTIC R Single Stage SELECTE Rocket Technology DC-X Test Program," https://apps.dtic.mil/dtic/tr/fulltext/u2/a265940, Jun. 1, 1992, 148 pages.

GeekTimes, "Integrated Soluation for Capturing and Retaining the Return Stages of Space Vehicles, (non-official translation)" https://geektimes.ru/post/273208, Mar. 23, 2016, 4 pages.

International Search Report and Written Opinion for International Patent Application No. PCT/US17/68602, Applicant; Blue Origin LLC, dated May 17, 2018, 11 pages.

"A Collection of the 13th AIAA/CIRA international space planes and hypersonic systems and technologies conference: a ; collection of technical papers," American Institute of ; Aeronautics and Astronautics, vol. 2, 2005, pp. 830-832.

"DC-X Successfully Completes Sixth Test Flight,"; http://www.thefreelibrary.com/DC-X+SUCCESSFULLY+COMPLETES+SIXTH+TEST+FLIGHT-a016839331, accessed: Oct. 15, 2014, 1 page.

"Delta Clipper Demonstrates Re-Entry Maneuver," http://www.thefreelibrary.com/DELTA+CLIPPER+DEMONSTRATES+RE-ENTRY+MANEUVER-a017203138, ; accessed: Oct. 15, 2014, 1 page.

"Solid Rocket Boosters and Post Launch ; Processing," NASA Facts, National Aeronautics and Space Administration, John F. Kennedy Space Center, 2006, 8 pages.

Aerospace America, "The 787 and the ; A350 Teasing out the Facts," Publication of The American Institute of Aeronautics and Astronautics, Jun. 2009, 3 pages.

Blum et al., "Dual Liquid Flyback Booster for the Space Shuttle," Lockheed Martin Michoud Space Systems, New Orleans, Lousiana, Jul. 1998, 11 pages.

Butrica, Andrew J., "Single stage to orbit: politics, space ; technology, and the quest for reusable rocketry," The Johns Hopkins University Press, 2003, 178-182.

Cohan et al., "Space transportation systems: 1980-2000," American Institute of Aeronautics and Astronautics, 1978, ; pp. 37-47.

Declaration of Marshal H. Kaplan, Ph.D. in Support of the Petition of Inter Partes Review of U.S. Pat. No. 8,678,321 dated Aug. 25, 24, 142 pages.

Gaubatz et al., "DC-X Results and the Next Step," AIAA Space Programs and Technologies Conference and Exhibit, Sep. 27-29, 1994, 15 pages.

Gifford, James M., "The Ride," Satellite Communications, ProQuest Science Journal, Jun. 1998, 4 pages.

Gunston, Bill, "The Cambridge Aerospace Dictionary—Second Edition," Cambridge University Press, 2009, 6 pages.

Hare, John "VTVLs as RTLS Boosters," Selenian Boondocks, http://selenianboondocks.com/2010/06/vtvls-as-rtls-boosters/, accessed Jun. 30, 2010, 6 pgs.

Ishijima et al., "Re-entry and Terminal Guidance for Vertical-Landing TSTO (Two-Stage to Orbit)," A Collection of Technical Papers Part 1, AIAA Guidance, Navigation and Control Conference and Exhibit, Aug. 10-12, 1998, 9 pages.

Kaplan H. Marshall, "Space Shuttle: America's Wing to the Future," 1978, 28 pages.

Keith et al., "Propulsion System Advances that Enable a Refusable Liquid Fly Back Booster (LFBB)" Boeing Reusable Space Systems, Downey California, Jul. 1998, 8 pages.

M. Avilov. "Types Rockets Models (design and flight)," M.: Publishing house "DOSAAF", 1968. 2 pages.

McDonnell Douglas Aerospace, "Delta Clipper Test Program Off to Flying Start," http://www.hq.nasa.gov/pao/History/x-33/dcxtests.html, accessed: Oct. 15, 2014, 5 pages.

Memi, E., "A Step to the Moon: DC-X Experimental Lander ; Set Up Boeing for Future NASA Work," Boeing Frontiers, http://www.boeing.com/news/frontiers/archive/2008/aug/i_history.pdf, accessed Aug. 2008, 2 pages.

NASA, "Space Shuttle Program: Spanning 30 years of Discovery," http://www.nasa.gov/mission_pages/shuttle, accessed Aug. 13, 2014, 2 pages.

Pavlushenko et al., "Unmanned Aerial Vehicles History, Use, Distribution, Threats and Prospects of Development," National and Global Security: academic notes of the PIR-center. 2004. No. 2(26), 5 pages.

Persson et al., "Control of the Kistler K-1 First Stage Reorientation Prior to Entry," AIAA Guidance, Navigation and Control Conference, Technical Papers, vol. 2, Aug. 9-11, 1999, 13 pages.

Rogers, Lucy, "It's Only Rocket Science: An Introduction in Plain English," Springer Science and Business Media, 2008, 23 pages.

Steven J. Isakowitz, Joseph P. Hopkins, Joshua B. Hopkins, "International Reference Guide to Space Launch Systems," AIAA 4th Edition, 2004, 25 pages.

Stiennon et al., "The rocket company," American Institute of Aeronautics and Astronautics, 2005, pp. 159-161.

Vadus, Joseph R., Kondo, Takeo, "A Floating Offshore Satellite Launching Facility," Marine Technology Society, Marine Technology Society Journal, 1997/1998, 7 pages.

Waters et al., "Test Results of an F/A-18 Automatic Carrier Landing Using Shipboard Relatives GPS," ION 57th Biennial Guidance Test Symposium, Jun. 11-13, 2001, 11 pages.

* cited by examiner

VERTICAL LANDING SYSTEMS FOR SPACE VEHICLES AND ASSOCIATED METHODS

CROSS-REFERENCE TO RELATED APPLICATION(S)

This application claims the benefit of U.S. Provisional Patent Application No. 62/439,658, filed on Dec. 28, 2016, entitled VERTICAL LANDING SYSTEMS FOR SPACE VEHICLES AND ASSOCIATED METHODS, which is hereby incorporated by reference in its entirety.

TECHNICAL FIELD

The present disclosure relates generally to methods and systems for landing space vehicles.

BACKGROUND

Despite the rapid growth and advances in manned and unmanned space flight, delivering astronauts, satellites, and/or other payloads into space remains an expensive undertaking. One reason for this is that most conventional launch vehicles are, for the most part, expendable launch vehicles (ELVs), meaning that the expensive rocket engines, avionics, etc. are only used once and then discarded. One example of a partially reusable space launch system is the NASA space shuttle. Although the shuttle's external fuel tank is only used once, the shuttle, its main engines, and its two solid rocket boosters are reused—albeit after substantial reconditioning. The advantages of reusable launch vehicles (RLVs) include the potential of providing low cost access to space.

Although NASA's space shuttle is largely reusable, the reconditioning and other tasks that are required after each launch still make the shuttle an expensive proposition. Moreover, many of the systems and equipment the shuttle carries to facilitate reentry and landing negatively impact the lifting capability of the vehicle in terms of payload. As commercial pressures for delivering both human and non-human payloads to space increase, there remains a continuing need to reduce the per-mission cost of space flight.

DETAILED DESCRIPTION

The present disclosure is directed generally to methods and systems for vertically landing space launch vehicles. In one embodiment, for example, a vertically-landing vehicle deploys a hook to catch wires or other arresting devices on ground support equipment to slow and capture the vehicle. Several details describing structures and processes that are well-known and often associated with space vehicles, space vehicle landing systems, etc. are not set forth below to avoid unnecessarily obscuring the description of the various embodiments of the disclosure. Moreover, although the following disclosure sets forth several embodiments, several other embodiments can have different configurations, arrangements, and/or components than those described below. In particular, other embodiments may have additional elements, or may lack one or more of the elements described below with reference to the Figures.

Figure 1A:
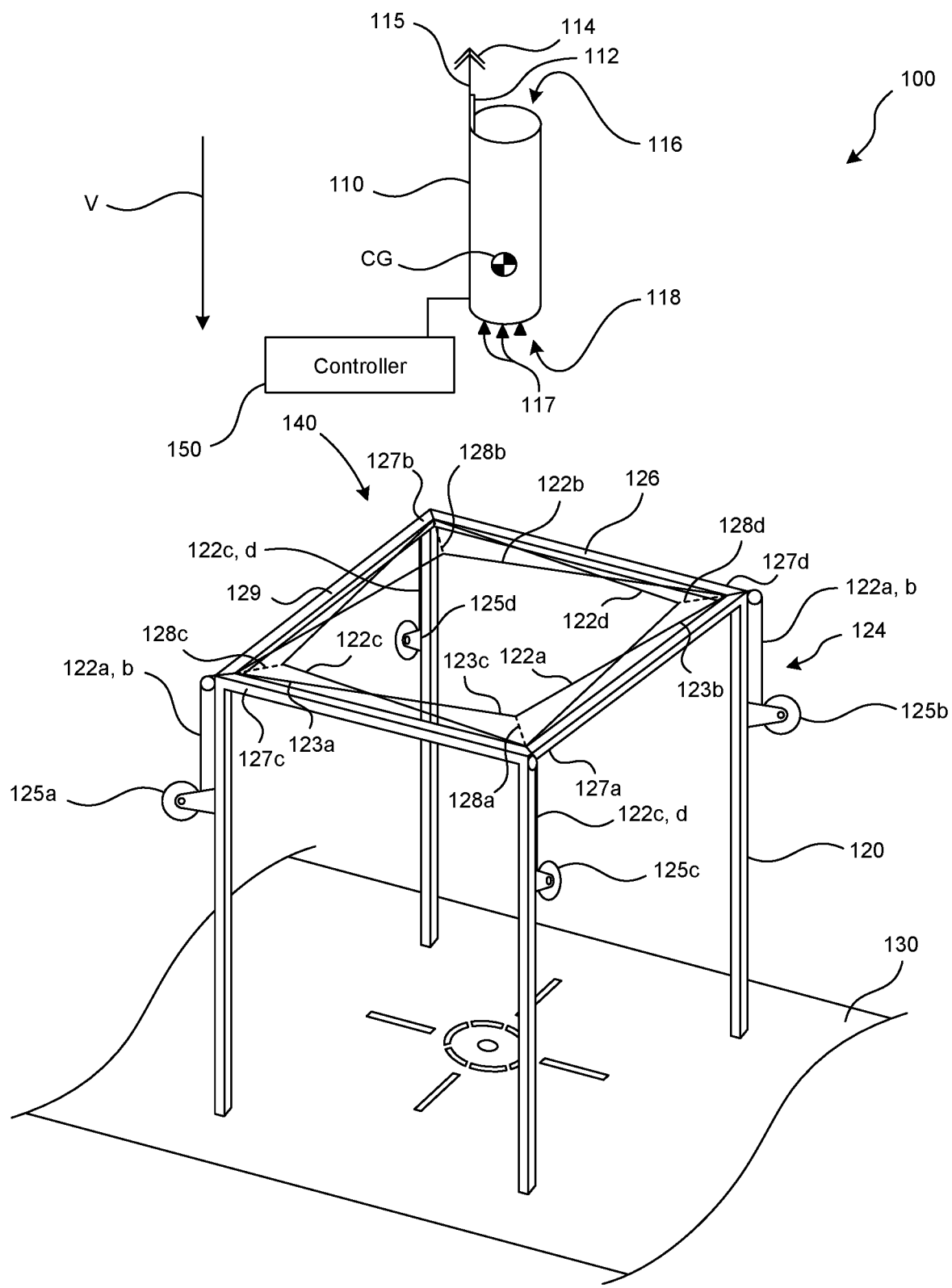
FIG. 1A is a schematic, isometric illustration of a space vehicle vertical landing system configured in accordance with an embodiment of the disclosure.
Figure 1B:
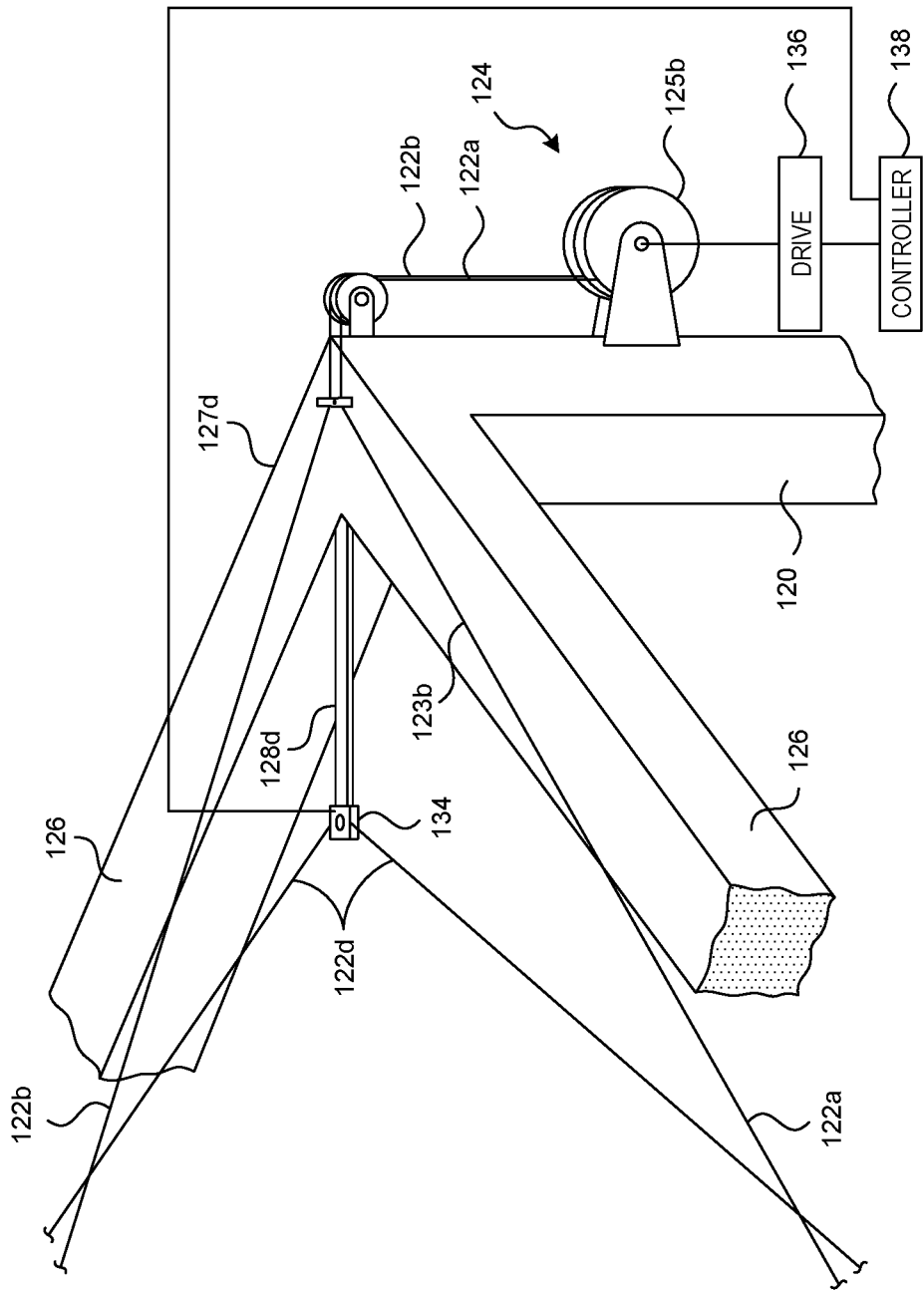
FIG. 1B is an enlarged view of a portion of the vertical landing system.

FIG. 1A is a schematic, isometric illustration of a space vehicle vertical landing system 100 configured in accordance with an embodiment of the disclosure, and FIG. 1B is an enlarged view of a portion of the vertical landing system 100. In the illustrated embodiment, a space vehicle 110 is descending in a vertical direction V toward a "capture zone" of the landing system 100. The space vehicle 110 has a forward end 116 that can support, e.g., human and/or non-human payload compartments, avionics suites, upper stages, etc. The vehicle 110 also has an aft end 118 for mounting one or more rocket engines 117 and/or other propulsive devices. In some embodiments, the space vehicle 110 can be a booster stage of a multistage vehicle.

In the illustrated embodiment, an arresting or engagement device, e.g., a hook 114 is located at the forward end 116 of the vehicle 110. In some embodiments, the hook 114 can be structurally attached to the vehicle 110 by means of a cable 115 that transmits structural loads between the hook 114 and the vehicle 110. The hook 114 can be fixed in position or it can be deployed in preparation for landing. For example, in one embodiment, the hook 114 can be carried on a distal end of a mast 112 (e.g., a sacrificial mast) or similar structure that is deployed upwardly from the forward end 116 of the vehicle 110 after an upper stage or other structure has separated therefrom. The hook 114 and/or the mast 112 can also be deployed after reentry of the vehicle 110, but prior to final descent for landing.

The vehicle 110 can further include a controller 150 operably connected to various vehicle systems (e.g., the engines 117, attitude thrusters, staging systems, control surfaces, landing gear, hook deployment and/or control systems, etc.) for controlling vehicle functions. In some embodiments, the controller 150 can include one or more digital or computer-based processing devices carried by the vehicle 110, and can execute instructions carried on e.g., non-transitory computer-readable media to control various vehicle functions. Such functions can include, for example, the operation of the engines 117, control surfaces (e.g., movable control surfaces, deployable control surfaces, bidirectional control surfaces, etc. to control, e.g., flight path), landing gear, the hook 114, vehicle staging, communications, etc. The controller 150 can receive input signals from any of a variety of sources and/or sensors (e.g., an accelerometer, a GPS sensor, an altitude sensor, a pressure sensor, a time sensor (e.g., a clock), etc.), on the basis of which the controller 150 can operate and/or issue instructions for operating the various vehicle systems. In some embodiments, the controller 150 can receive input signals from an air-, land-, sea- or space-based station. In other embodiments, the controller 150 or portions thereof can be located off the vehicle 110 (e.g., on an air-, land-, sea- or space-based station).

In another aspect of this embodiment, the landing system 100 includes a support structure 120 positioned on a landing pad 130. The landing pad 130 can be located on land or at sea on, e.g., a barge, ship, derrick, etc. depending on the launch vehicle requirements. The support structure 120 can include a plurality of elevated beams 126 and/or other structures which form, e.g., a frame 129 that at least partially defines an opening 140 (e.g., a generally square opening) in the support structure 120 through which the vehicle 110 descends during landing.

A plurality of ground support equipment (GSE) arresting cables 122 (identified individually as cables 122a-122d) are arranged around the opening 140 in the upper portion of the support structure 120. By way of example, in the illustrated embodiment, a first end portion 123a of the first cable 122a is attached toward a third corner portion 127c of the frame 129 via a first pulley 125a, a second end portion 123b of the first cable 122a is attached toward a fourth corner portion 127d via a second pulley 125b, and a medial portion 123c of the first cable 122a is releasably held back toward a first corner portion 127a. More particularly, in the illustrated embodiment the medial portion 123c of the first cable 122a is temporarily pulled back toward the first corner portion 127a of the opening 140 by a first temporary restraint 128a. Similarly, the second, third, and fourth cables 122b-d are temporarily pulled back toward their respective corner portions 127b-d by second, third, and fourth temporary restraints 128b-d, respectively. The temporary restraints 128 can include cables, hooks, clamps, and/or other operative devices that temporarily hold the cables 122 back in their respective corners and away from the center portion of the opening 140 until receiving a signal to release the corresponding cable 122. For example, referring to FIG. 1B, in some embodiments the temporary restraints 128 (e.g., the temporary restraint 128d) can include a releasable hook 134 that temporarily holds a medial portion of the fourth cable 122d back toward the fourth corner portion 127d until receiving a release signal from, e.g., a controller 138. As described in greater detail below, the temporary restraints 128 can be pyrotechnically, electronically, mechanically, optically, magnetically and/or manually actuated to release the cables 122 at the appropriate time to catch the hook 114 on the vehicle 110.

The cables 122 and/or the vehicle cable 115 can include energy absorbing systems to bring the vehicle 110 to a stop in a manner that reduces acceleration loads on the vehicle 110. In the illustrated embodiment, for example, each of the cables 122 is operably coupled to an energy absorbing system 124. The energy absorbing system 124 can include a system of pulleys 125 about which the cables 122 can be wound. In addition, weights (not shown) can be attached to distal ends of the cables 122 in some embodiments to quickly deploy the cables 122 upon their release from the respective restraints 128. The pulleys 125 and/or other associated equipment (e.g., winches) can be mechanically, hydraulically, pneumatically, and/or otherwise dampened, biased and/or driven in a desired direction to actively and/or passively control the tension in the cables 122 during operation of the landing system 100. For example, referring to FIGS. 1A and 1B together, as described in greater detail below, the first and second pulleys 125a, b and/or associated equipment (e.g., a drive system 136 (including, for example, a motor), the controller 138, etc.) can facilitate retraction and/or application of controlled tension to the first and second cables 122a, b when the first and second cables 122a, b are released by the respective temporary restraints 128a, b. Similarly, the third and fourth pulleys 125c, d and/or associated equipment can retract and/or apply controlled tension to the third and fourth cables 122c, d when the third and fourth cables 122c, d are released by the respective temporary restraints 128c, d. In some embodiments, the controller 138 can include one or more digital or computer-based processing devices and can execute instructions carried on e.g., non-transitory computer-readable media to control one or more operations of the landing system 100. Such functions can include, for example, operation of the temporary restraints 128 and/or the energy absorbing system 124. The controller 138 can receive input signals from any of a variety of sources and/or sensors on the basis of which the controller 138 can operate and/or issue instructions for operating the various systems.

Figure 2B:
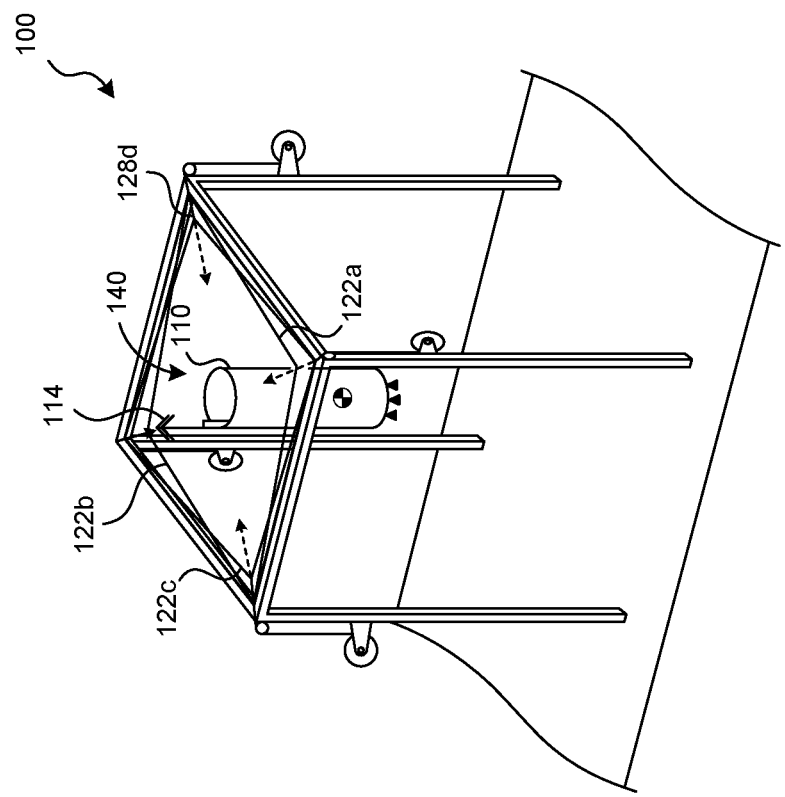
FIGS. 2A-2D are a series of schematic isometric views illustrating various stages in a method of landing a space vehicle in a vertical descent in accordance with an embodiment of the disclosure.
Figure 2A:
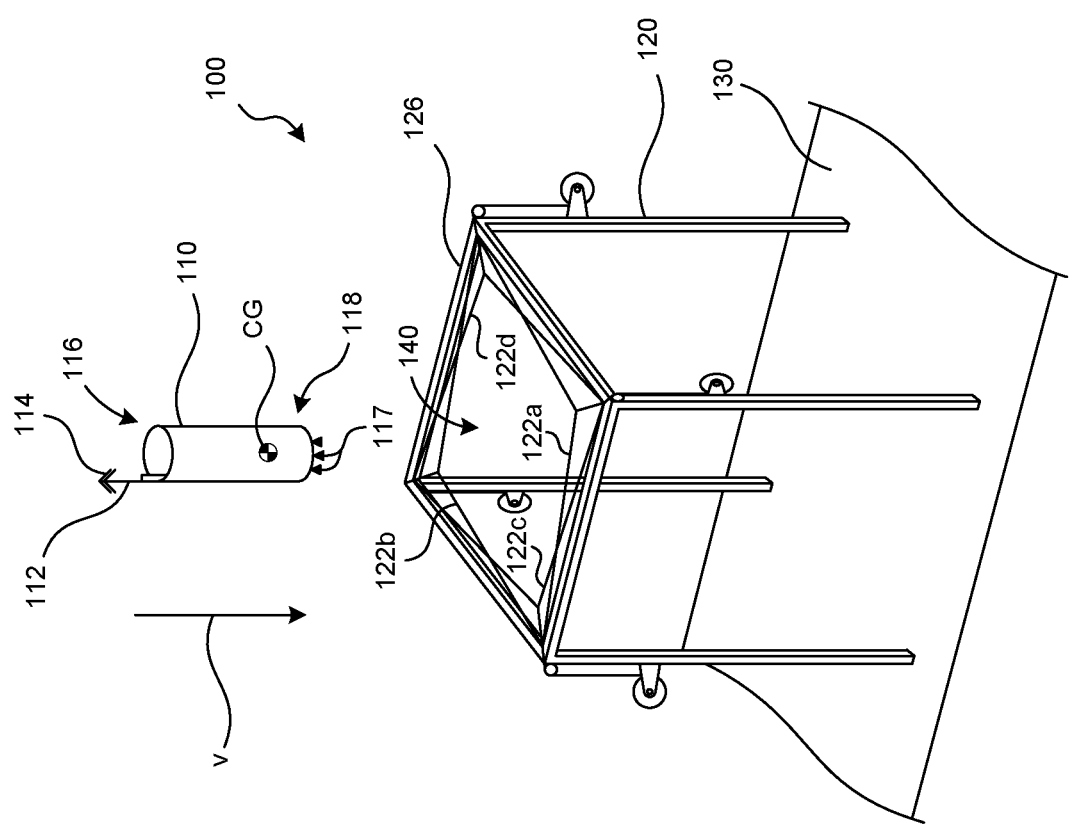

FIGS. 2A-D are a series of schematic isometric views illustrating various stages in operation of the landing system 100 in accordance with an embodiment of the disclosure. Referring first to FIG. 2A, the space vehicle 110 steers or otherwise moves to a designated location within the capture zone of the landing system 100 (e.g., a center portion of the opening 140). At this time, the vehicle 110 is in a vertical, nose-up orientation with the rocket engines 117 (and/or attitude control thrusters, etc.) thrusting to control rate of descent, position, attitude, etc. In one embodiment, the vehicle 110 can be descending at a rate of from about 5 feet per second to about 20 feet per second. In other embodiments, the vehicle 110 can be descending at greater or lesser rates. As the vehicle 110 descends in the vertical direction V, the hook and cable system (114 and 115) deploys from the forward end 116 of the vehicle 110 via the mast 112. In other embodiments, the hook and/or cable can be deployed by parachute or other means, or the mast 112, cable 115, and/or hook 114 can be fixed in a deployed position.

Figure 2C:
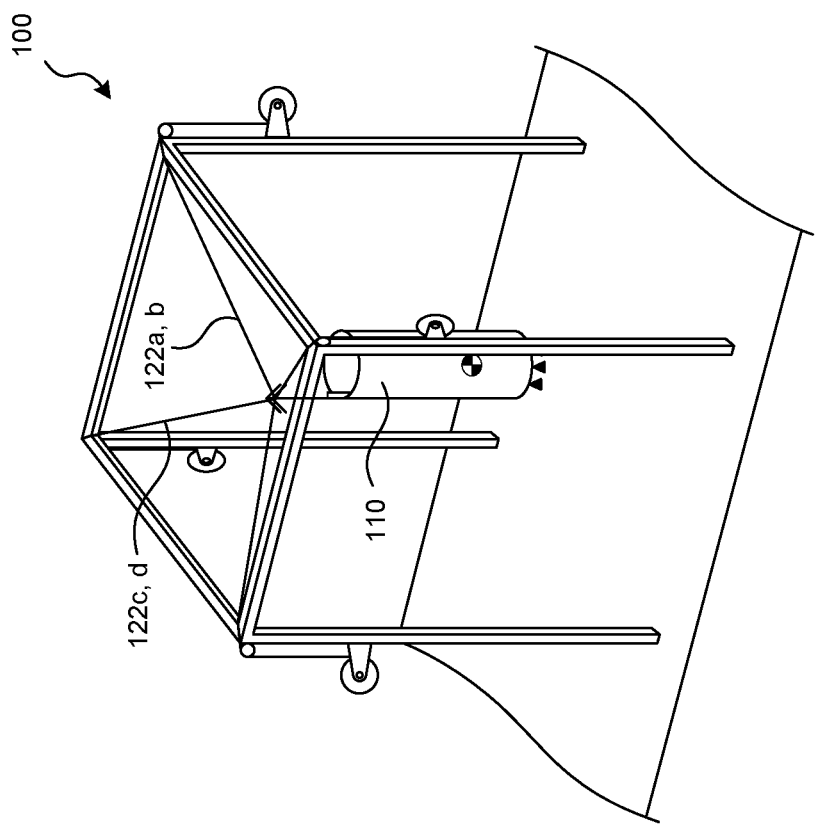
Figure 2D:
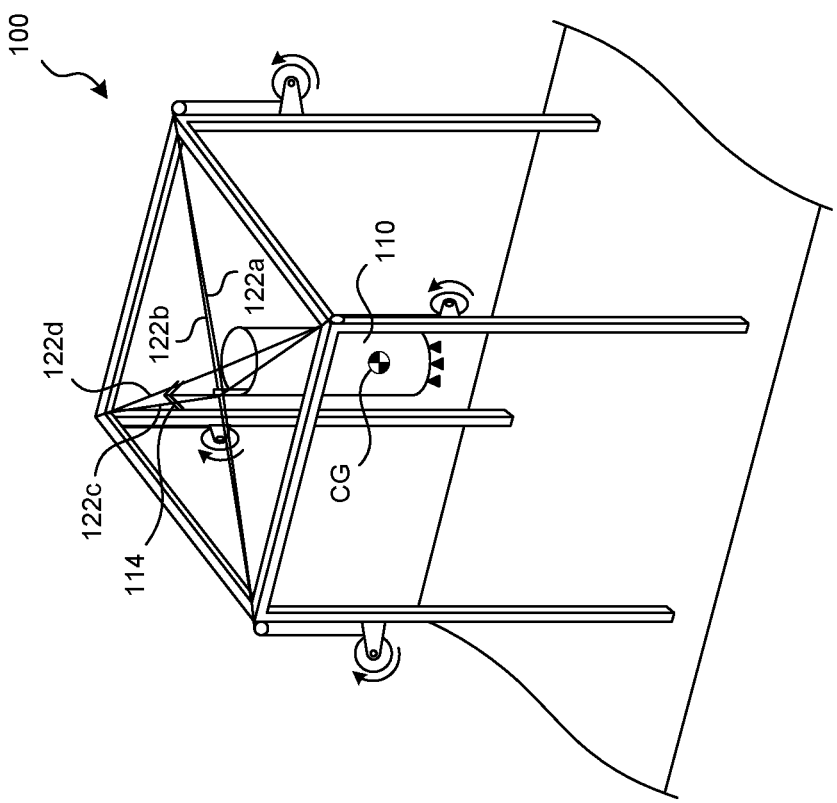

As shown in FIGS. 2B and 2C, when the forward end 116 of the vehicle 110 passes near or below the plane of the cables 122, the temporary restraints 128 (FIGS. 1A and 1B) release the cables 122 from their respective corners (e.g., their "stored positions"). The tension in the cables 122 causes them to draw tightly across the center portion of the opening 140 and trap the vehicle mast 112 and/or cable 115 therebetween. As the vehicle 110 continues moving downwardly, the hook 114 engages one or more of the cables 122, which lock in a "neutral" (e.g., centered) position. Further descent of the vehicle 110 is controlled by tension in the cables 122 which can be built up in a controlled manner (e.g., via the energy absorbing system 124 in FIGS. 1A and 1B) to gently decelerate the vehicle 110. Once the vertical motion and swaying of the vehicle has subsided or stopped, the vehicle 110 can be safely lowered to the deck of the landing pad 130, ground, etc. for interfacing with service stands and preparation for storage or another launch.

In one embodiment, the cables 122 can be configured to overshoot the center of the opening 140 by a predetermined amount when released from their respective corners. In this way, the cables 122 will overlap slightly when they come to rest, and the ends of each cable 122 will be slightly offset from the center of the opening 140 in a direction away from the respective corner from which it was released. This slight offset can be used to compensate for any spring-back in the cables that might occur after they initially cross the center of the opening 140, and can enhance the ability of the hook 114 to engage one or more of the cables 122 during descent.

Vertically landing launch vehicles (especially those that are relatively tall) with base-mounted landing gears may have a tendency to tip over during landing, because the landing gear is mounted below the center of gravity (CG) of the vehicle. To avoid this problem, landing gears which interface with the ground are typically wide enough to avoid tipping over of the vehicle, especially in the presence of the lateral forces from wind, etc. This structure can add undesirable weight to a launch vehicle. As shown in FIG. 2C, in the illustrated embodiment of the disclosure the hook 114 is located well above the center of gravity of the vehicle 110 (identified as "CG" in FIG. 2C). As a result, the tip over problem is solved because the vehicle is stably supported from above the CG during landing. This embodiment lends itself well to ship-based landing systems, because the expected ship motion poses little difficulty to a landing system which supports the vehicle above the CG.

The energy absorbing system 124 can be incorporated into the system of cables 122, the vehicle cable 115, or both. If the energy absorbing system 124 is incorporated into the cables 122, this will reduce the flying weight of the vehicle 110, which in turn will save fuel and improve vehicle performance. The energy absorbing system 124 enables the GSE cables 122 or the vehicle cable 115 to deliver a predetermined force/displacement response using, e.g., the pulleys 125 (FIGS. 1A and 1B), a cam system, spring system, winch system, and/or other suitable energy absorbing systems. Such systems can include, for example, hydraulic actuators as used in conventional aircraft landing gears, aircraft carrier cable arrest systems for aircraft, crushable honeycomb or similar energy absorbing material. The energy absorbing system can be configured to give the cables 122 and/or the vehicle cable 115 a prescribed load/stroke behavior that provides the vehicle 110 with a sufficiently gentle (i.e., low acceleration/deceleration) landing.

The cables 122 can be deployed at the appropriate time during vehicle descent using a number of different systems and/or methods. For example, one system can include a GPS altitude sensing device that determines the vehicle altitude and deploys the cables when the vehicle mast 112/cable 115 is in an appropriate location. Other systems can include manual triggering systems based on visual observations of the vehicle 110, optical beam/net brake systems, radar systems, sound level measurement systems, and/or other suitable means.

Figure 3:
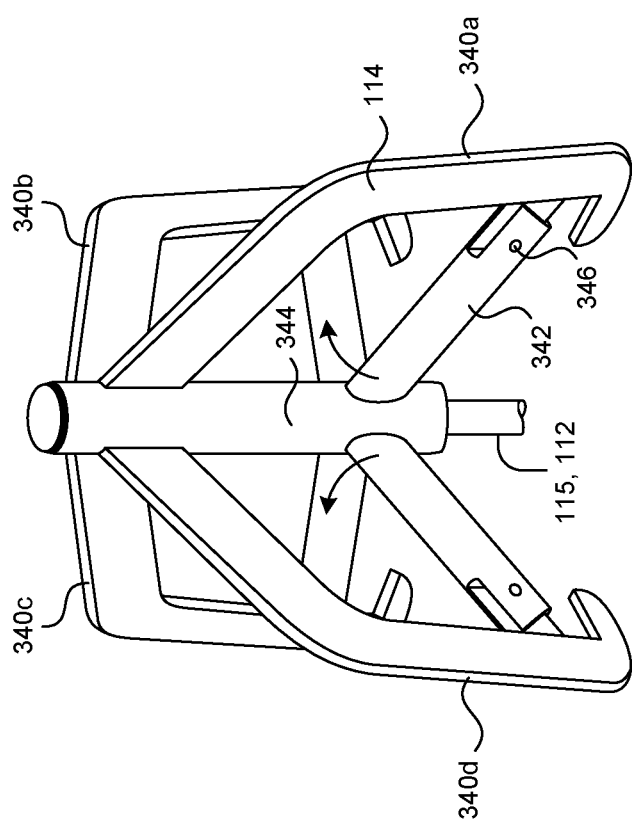
FIG. 3 is an isometric view illustrating a launch vehicle landing hook configured in accordance with an embodiment of the disclosure.

FIG. 3 is an isometric view of a hook 114 configured in accordance with an embodiment of the disclosure. In the illustrated embodiment, the hook 114 includes a plurality of downwardly open hook arms 340a-340d which extend from a central core 344. The central core 344 can be fixedly attached to the vehicle mast 112 and/or the cable 115 extending therefrom. The hook 114 can also include a plurality of one-way links 342 or other locking features that can rotate inwardly about a pivot 346 to capture and retain the cables 122 in their respective hook arms 340 during vehicle descent.

Figure 4:
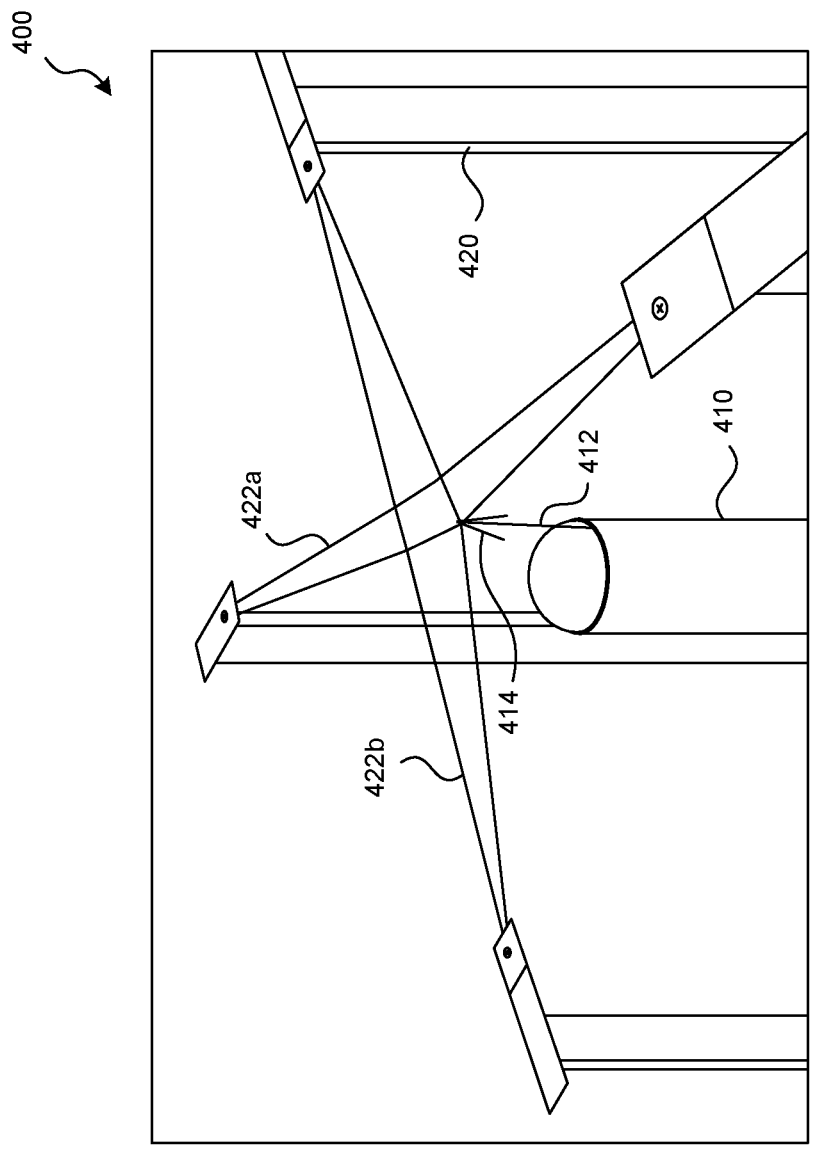
FIG. 4 is a schematic isometric view of a sub-scale test fixture for testing various methods and systems in accordance with embodiments of the disclosure.

FIG. 4 is an isometric view of a sub-scale test system 400 for testing various aspects of the landing system 100 in accordance with an embodiment of the disclosure. The test system 400 includes a support structure 420 and a system of corresponding GSE cables 422. These components can be at least generally similar in structure and function to the corresponding components described above with reference to FIGS. 1-2D. As this view illustrates, a test vehicle 410 has been dropped through the capture zone and engaged with one or more of the GSE cables 422 to test the basic concept of the vertical landing system 100 described above.

Although only a single hook 114 is illustrated in the embodiments described above, in other embodiments redundant hooks 114 and/or redundant GSE cables 122 can be utilized. In further embodiments, the vehicle 110 can include one or more cables in a lasso configuration in addition to or in place of the hook 114 to capture a hook or other structure on the landing system. In yet other embodiments, the landing platform 130 can include an opening or aperture when used over water to provide water dampening of the rocket engine thrust during vehicle descent over the pad. In still further embodiments, the cables 122 can be guided onto the hook 114 instead of the hook being guided onto the cables 122, or vice versa.

Many embodiments of the technology described above may take the form of computer-executable instructions, including routines executed by a programmable computer or controller, such as the controller 150 and/or the controller 138. Those skilled in the relevant art will appreciate that the technology can be practiced on computer systems other than those shown and described. The technology can be embodied in a special-purpose computer or data processor that is specifically programmed, configured or constructed to perform one or more of the computer-executable instructions, processes and methods described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini-computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. In particular embodiments, data structures and transmissions of data particular to aspects of the technology are also encompassed within the scope of the technology.

The disclosures of U.S. Patent Application No. 61/152,539, filed Feb. 13, 2009, and titled MULTIPLE-USE ROCKET ENGINES AND ASSOCIATED SYSTEMS AND METHODS; U.S. patent application Ser. No. 12/704,690, filed Feb. 12, 2010, and titled MULTIPLE-USE ROCKET ENGINES AND ASSOCIATED SYSTEMS AND METHODS; U.S. Patent Application No. 61/155,132, filed Feb. 24, 2009, and titled TAPERED ROCKET FUEL TANKS AND ASSOCIATED SYSTEMS AND METHODS; U.S. Patent Application No. 61/187,243, filed Jun. 15, 2009, and titled SEA LANDING OF SPACE LAUNCH VEHICLES AND ASSOCIATED SYSTEMS AND METHODS; U.S. Patent Application No. 61/218,029, filed Jun. 17, 2009, and titled SEA LANDING OF SPACE LAUNCH VEHICLES AND ASSOCIATED SYSTEMS AND METHODS, INCLUDING EN ROUTE VEHICLE REFURBISHMENT; U.S. patent application Ser. No. 12/815,306, filed Jun. 14, 2010, issued as U.S. Pat. No. 8,678,321, and titled SEA LANDING OF SPACE LAUNCH VEHICLES AND ASSOCIATED SYSTEMS AND METHODS; U.S. patent application Ser. No. 14/559,77, filed Dec. 3, 2014 and titled SEA LANDING OF SPACE LAUNCH VEHICLES AND ASSOCIATED SYSTEMS AND METHODS; U.S. Patent Application No. 61/187,249, filed Jun. 15, 2009, and titled PREDICTING AND CORRECTING TRAJECTORIES; U.S. Patent Application No. 61/187,250, filed Jun. 15, 2009, and titled PREDICTING AND CORRECTING TRAJECTORIES; U.S. patent application Ser. No. 12/816,284, filed Jun. 15, 2010, issued as U.S. Pat. No. 8,729,442 and titled PREDICTING AND CORRECTING TRAJECTORIES; U.S. Patent Application No. 61/187,253, filed Jun. 15, 2009, and titled COMPENSATING FOR WIND PRIOR TO ENGAGING AIRBORNE PROPULSION DEVICES; U.S. patent application Ser. No. 12/816,267, filed Jun. 15, 2010, and titled COMPENSATING FOR WIND PRIOR TO ENGAGING AIRBORNE PROPULSION DEVICES; U.S. Patent Application No. 61/187,268, filed Jun. 15, 2009, and titled BIDIRECTIONAL CONTROL SURFACES FOR USE WITH HIGH SPEED VEHICLES, AND ASSOCIATED SYSTEMS AND METHODS; U.S. patent application Ser. No. 12/712,083, filed Feb. 24, 2010, issued as U.S. Pat. No. 8,878,111 and titled BIDIRECTIONAL CONTROL SURFACES FOR USE WITH HIGH SPEED VEHICLES, AND ASSOCIATED SYSTEMS AND METHODS; U.S. patent application Ser. No. 13/968,326, filed Aug. 15, 2013, issued as U.S. Pat. No. 8,876,059 and titled BIDIRECTIONAL CONTROL SURFACES FOR USE WITH HIGH SPEED VEHICLES, AND ASSOCIATED SYSTEMS AND METHODS; U.S. patent application Ser. No. 14/103,742, filed Dec. 11, 2013, issued as U.S. Pat. No. 8,894,016 and titled BIDIRECTIONAL CONTROL SURFACES FOR USE WITH HIGH SPEED VEHICLES, AND ASSOCIATED SYSTEMS AND METHODS; U.S. patent application Ser. No. 14/508,595, filed Oct. 7, 2014, issued as U.S. Pat. No. 8,991,767 and titled CONTROL SURFACES FOR USE WITH HIGH SPEED VEHICLES, AND ASSOCIATED SYSTEMS AND METHODS; U.S. patent application Ser. No. 14/550,782, filed Nov. 21, 2014, issued as U.S. Pat. No. 9,580,191 and titled CONTROL SURFACES FOR USE WITH HIGH SPEED VEHICLES, AND ASSOCIATED SYSTEMS AND METHODS; U.S. patent application Ser. No. 15/391,782, filed Dec. 27, 2016 and titled CONTROL SURFACES FOR USE WITH HIGH SPEED VEHICLES, AND ASSOCIATED SYSTEMS AND METHODS; U.S. Patent Application No. 61/155,152, filed Feb. 24, 2009 and titled VERTICAL LANDING SYSTEMS FOR SPACE VEHICLES AND ASSOCIATED METHODS; U.S. Patent Application No. 61/155,471, filed Feb. 25, 2009 and titled VERTICAL LANDING SYSTEMS FOR SPACE VEHICLES AND ASSOCIATED METHODS; U.S. Patent Application No. 61/307,416, filed Feb. 23, 2010 and titled VERTICAL LANDING SYSTEMS FOR SPACE VEHICLES AND ASSOCIATED METHODS; U.S. Patent Application No. 61/445,513, filed Feb. 22, 2011 and titled VERTICAL LANDING SYSTEMS FOR SPACE VEHICLES AND ASSOCIATED METHODS; U.S. Patent Application No. 61/601,388, filed Feb. 21, 2012 and titled VERTICAL LANDING SYSTEMS FOR SPACE VEHICLES AND ASSOCIATED METHODS; U.S. Patent Application No. 61/767,148, filed Feb. 20, 2013 and titled VERTICAL LANDING SYSTEMS FOR SPACE VEHICLES AND ASSOCIATED METHODS; U.S. Patent Application No. 61/941,814, filed Feb. 19, 2014 and titled VERTICAL LANDING SYSTEMS FOR SPACE VEHICLES AND ASSOCIATED METHODS; U.S. Patent Application No. 62/103,464, filed Jan. 14, 2015 and titled VERTICAL LANDING SYSTEMS FOR SPACE VEHICLES AND ASSOCIATED METHODS; U.S. Patent Application No. 62/276,210, filed Jan. 7, 2016 and titled VERTICAL LANDING SYSTEMS FOR SPACE VEHICLES AND ASSOCIATED METHODS; U.S. Patent Application No. 62/439,658, filed Dec. 28, 2016 and titled VERTICAL LANDING SYSTEMS FOR SPACE VEHICLES AND ASSOCIATED METHODS; U.S. Patent Application No. 61/155,115, filed Feb. 24, 2009, and titled ROCKETS WITH DEPLOYABLE FLARE SURFACES, AND ASSOCIATED SYSTEMS AND METHODS; U.S. patent application Ser. No. 12/712,156, filed Feb. 24, 2010, issued as U.S. Pat. No. 8,408,497 and titled LAUNCH VEHICLES WITH FIXED AND DEPLOYABLE DECELERATION SURFACES, AND/OR SHAPED FUEL TANKS, AND ASSOCIATED SYSTEMS AND METHODS; U.S. Patent Application No. 61/153,957, filed Feb. 19, 2009 and titled MODULAR FRICTION STIR WELDING HEAD AND ASSOCIATED SYSTEMS AND METHODS; U.S. patent application Ser. No. 12/708,474, filed Feb. 18, 2010, issued as U.S. Pat. No. 8,408,443 and titled MODULAR FRICTION WELDING HEAD AND ASSOCIATED SYSTEMS AND METHODS; U.S. Patent Application No. 61/187,259, filed Jun. 15, 2009 and titled EYEBALL SEALS FOR GIMBALED ROCKET ENGINES, AND ASSOCIATED SYSTEMS AND METHODS; U.S. patent application Ser. No. 12/815,288, filed Jun. 14, 2010 and titled EYEBALL SEALS FOR GIMBALED ROCKET ENGINES, AND ASSOCIATED SYSTEMS AND METHODS; U.S. Patent Application No. 61/244,006, filed Sep. 18, 2009 and titled COMPOSITE STRUCTURES FOR AEROSPACE VEHICLES, AND ASSOCIATED SYSTEMS AND METHODS; U.S. Patent Application No. 61/244,008, filed Sep. 18, 2009 and titled COMPOSITE STRUCTURES FOR AEROSPACE VEHICLES, AND ASSOCIATED SYSTEMS AND METHODS; U.S. patent application Ser. No. 13/029,007, filed Feb. 16, 2011, issued as U.S. Pat. No. 9,079,674 and titled COMPOSITE STRUCTURES FOR AEROSPACE VEHICLES, AND ASSOCIATED SYSTEMS AND METHODS; U.S. patent application Ser. No. 14/733,824, filed Jun. 8, 2015, now issued as U.S. Pat. No. 9,469,418 and titled COMPOSITE STRUCTURES FOR AEROSPACE VEHICLES, AND ASSOCIATED SYSTEMS AND METHODS; U.S. Patent Application No. 61/259,068, filed Nov. 6, 2009 and titled CONTOURED ROLLER SYSTEM AND ASSOCIATED METHODS AND RESULTING ARTICLES OF MANUFACTURE; U.S. patent application Ser. No. 12/941,955, filed Nov. 8, 2010, now issued as U.S. Pat. No. 8,720,067 and titled CONTOURED ROLLER SYSTEM AND ASSOCIATED METHODS AND RESULTING ARTICLES OF MANUFACTURE; U.S. Patent Application No. 61/411,274, filed Nov. 8, 2010 and titled ROCKET TURBOPUMP VALVES AND ASSOCIATED SYSTEMS AND METHODS; U.S. patent application Ser. No. 13/292,008, filed Nov. 8, 2011 and titled ROCKET TURBOPUMP VALVES AND ASSOCIATED SYSTEMS AND METHODS; U.S. patent application Ser. No. 13/293,062, filed Nov. 9, 2011 and titled ROCKET TURBOPUMP VALVES AND ASSOCIATED SYSTEMS AND METHODS; U.S. patent application Ser. No. 13/294,061, filed Nov. 10, 2011, now issued as U.S. Pat. No. 9,217,389 and titled ROCKET TURBOPUMP VALVES AND ASSOCIATED SYSTEMS AND METHODS; U.S. Patent Application No. 61/479,771, filed Apr. 27, 2011 and titled INFLATABLE RING FOR SUPPORTING FRICTION WELDING WORKPIECES, AND ASSOCIATED SYSTEMS AND METHODS; U.S. patent application Ser. No. 13/456,118, filed Apr. 25, 2012, now issued as U.S. Pat. No. 8,534,530 and titled INFLATABLE RING FOR SUPPORTING FRICTION WELDING WORKPIECES, AND ASSOCIATED SYSTEMS AND METHODS; U.S. patent application Ser. No. 13/833,985, filed Mar. 15, 2013, issued as U.S. Pat. No. 9,487,985 and titled LAUNCH VEHICLES WITH RING-SHAPED EXTERNAL ELEMENTS, AND ASSOCIATED SYSTEMS AND METHODS; U.S. patent application Ser. No. 15/342,501, filed Nov. 3, 2016 and titled LAUNCH VEHICLES WITH RING-SHAPED EXTER- NAL ELEMENTS, AND ASSOCIATED SYSTEMS AND METHODS; U.S. Patent Application No. 62/344,288, filed Jun. 1, 2016 and titled SEVERE WEATHER AGILITY THRUSTERS, AND ASSOCIATED SYSTEMS AND METHODS; and U.S. patent application Ser. No. 15/611,189, filed Jun. 1, 2017 and titled ROCKET BOOSTERS WITH FORWARD, LATERALLY-DIRECTED THRUSTERS, AND ASSOCIATED SYSTEMS AND METHODS, are incorporated herein in their entireties by reference. Indeed, all of the patents and patent applications identified above or elsewhere herein are incorporated herein in their entireties by reference.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A space vehicle system comprising: a landing pad;
a plurality of cables arranged above the landing pad, wherein the plurality of cables define an opening;
a cable support structure mounted to the landing pad;
a plurality of temporary restraints mounted to the cable support structure, wherein each of the temporary restraints is releasably secured to a medial portion of a corresponding one of the cables and releasably holds the corresponding cable in a stored position around the opening; and
a space vehicle having an engagement device attached thereto, wherein each of the temporary restraints is configured to release the medial portion of the corresponding cable as the space vehicle descends through the opening toward the landing pad, whereby the engagement device is configured to engage at least one of the cables, and whereby the at least one cable at least temporarily supports the space vehicle above the landing pad.

2. The system of claim 1 wherein each of the cables is moveable from the stored position to a deployed position in which the cables extends across the opening, and wherein the engagement device is configured to engage the at least one cable when the plurality of cables are in the deployed position.

3. The system of claim 1 wherein the opening has a central portion, and wherein each of the cables is movable from the stored position spaced apart from the central portion toward a deployed position proximate the central portion, and wherein the engagement device is configured to engage the at least one cable proximate the central portion of the opening.

4. The system of claim 1 wherein the space vehicle is configured to descend through the opening in a tail-first direction.

5. The system of claim 1 wherein the space vehicle has a forward end and an aft end, wherein the engagement device is attached toward the forward end, and wherein the space vehicle further includes one or more rocket engines attached toward the aft end.

6. The system of claim 1 wherein the space vehicle has a forward end and an aft end, wherein the engagement device is attached toward the forward end, wherein the space vehicle further includes one or more rocket engines attached toward the aft end, and wherein the space vehicle is configured to move through the opening in a tail-first direction while the one or more rocket engines are thrusting.

7. The system of claim 1 wherein the space vehicle further includes a deployable mast, wherein the engagement device is attached to a distal end portion of the deployable mast, and wherein the deployable mast is moveable from a stored position in which the engagement device is positioned proximate the space vehicle to a deployed position in which the engagement device is spaced apart from the space vehicle to engage the at least one cable.

8. The system of claim 1 wherein the space vehicle is a booster stage of a multistage rocket.

9. The system of claim 1 wherein the landing pad is positioned on a floating structure in a body of water.

10. A space vehicle landing system, comprising: a landing pad;
a support structure positioned on the landing pad, wherein the support structure includes a plurality of elevated members that define a frame around an opening, and wherein the opening is sized to permit a space vehicle to pass therethrough; and
a plurality of cables carried by the frame, wherein at least one of the cables has a first end portion attached to a first portion of the frame, a second end portion attached to a second portion of the frame, and a medial portion releasably held in a stored position by a temporary restraint attached to a third portion of the frame, wherein the third portion of the frame is positioned between the first and second portions, and wherein the temporary restraint is configured to release the medial portion from the frame and permit the at least one cable to move from the stored position around the opening to a deployed position extending across the opening to engage and arrest the space vehicle as the space vehicle passes through the opening.

11. The space vehicle landing system of claim 10, further comprising a cable retraction system operably coupled to at least one of the first or second end portions of the at least one cable, wherein the cable retraction system is configured to retract the at least one cable towards at least one of the first or second portions of the frame when the temporary restraint releases the medial portion of the at least one cable.

12. The space vehicle landing system of claim 10 wherein the frame is a multi-sided frame, wherein the first portion of the frame is a first corner portion of the frame, the second portion of the frame is a second corner portion of the frame, and the third portion of frame is a third corner portion of the frame, and wherein the at least one cable extends across the opening from the first corner portion to the second corner portion when the cable is in the deployed position.

13. The space vehicle landing system of claim 10
wherein the at least one cable is a first one of the cables and the temporary restraint is a first temporary restraint,
wherein a second one of the cables has a first end portion attached to the first portion of the frame, a second end portion attached to the second portion of the frame, and a medial portion releasably held in a stored position by a second temporary restraint attached to a fourth corner portion of the frame, wherein the fourth portion of the frame is positioned between the first and second portions and opposite to the third portion,
wherein the second temporary restraint is configured to release the medial portion of the second one of the cables from the frame and permit the second one of the cables to move from the stored position to the deployed position, and wherein the first and second ones of the cables extend across the opening from the first portion of the frame to the second portion of the frame when the first and second ones of the cables are in the deployed position.

14. The space vehicle landing system of claim 10 wherein the at least one cable is a first one of the cables and the temporary restraint is a first temporary restraint, wherein a second one of the cables has a first end portion attached to the third portion of the frame, a second end portion attached to a fourth portion of the frame, and a medial portion releasably held in a stored position by a second temporary restraint attached to the first portion of the frame, wherein the first portion of the frame is positioned between the third and fourth portions, wherein the second temporary restraint is configured to release the medial portion of the second one of the cables from the frame and permit the second one of the cables to move from the stored position to the deployed position, wherein the first one of the cables extends across the opening from the first portion of the frame to the second portion of the frame when the first one of the cables is in the deployed position, and wherein the second one of the cables extends across the first one of the cables from the third portion of the frame to the fourth portion of the frame when the second one of the cables is in the deployed position.

15. A space vehicle vertical landing system comprising:

a plurality of cables defining an opening above a landing platform;

a plurality of temporary restraints, wherein each of the temporary restraints is releasably secured to a medial portion of a corresponding cable and releasably holds the corresponding cable in a stored position around the opening; and a controller configured to execute instructions stored on non-transitory computer-readable media that cause the landing system to perform a method comprising:

detecting a position of a space vehicle relative to the opening; and when the space vehicle is at least proximate to the opening, causing the temporary restraints to release the medial portions of the corresponding cables, whereby at least one of the cables engages and restrains the space vehicle above the landing platform.

16. The space vehicle landing system of claim 15 wherein causing the temporary restraints to release the medial portions of the corresponding cables causes at least a first cable and a second cable to move toward each other and extend across the opening to engage the space vehicle.

17. The space vehicle landing system of claim 15 wherein the space vehicle is moving in a tail-first direction and includes an engagement device positioned toward a forward portion thereof, and wherein causing the temporary restraints to release the medial portions of the corresponding cables causes the at least one cable to engage the engagement device.

18. The space vehicle landing system of claim 15 wherein the method further comprises, after causing the temporary restraints to release the medial portions of the corresponding cables, tensioning the cables so that they extend generally across the opening.

* * * * *